United States Patent Office 3,222,249
Patented Dec. 7, 1965

3,222,249
1,9,10,11,12,12-HEXACHLOROTRICYCLO [7.2.1.0²·⁸]
DODECA-3,6,10-TRIENE, PROCESS FOR PREPARING SAID COMPOUND, AND INSECTICIDAL COMPOSITIONS CONTAINING SAID COMPOUND AS THE ACTIVE INGREDIENT
Mitsunobu Koremura and Toshio Shono, Tokyo, Japan, assignors to Sankyo Company Limited, Tokyo, Japan
No Drawing. Filed Feb. 14, 1963, Ser. No. 258,647
Claims priority, application Japan, Feb. 22, 1962, 37/6,062
7 Claims. (Cl. 167—30)

This invention relates to 1,9,10,11,12,12-hexachlorotricyclo [7.2.1.0$^{2.8}$] dodeca-3,6,10-triene, process for preparing said compound and insecticidal compositions containing said compound as the active ingredient.

1,9,10,11,12,12-hexachlorotricyclo [7.2.1.0$^{2.8}$] dodeca-3,6,10-triene mentioned above is a novel compound, which may be represented by the structural formula

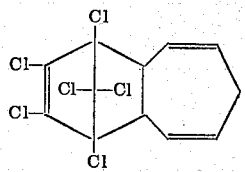

and has potent insecticidal activities.

Recently increasing number of compounds effective as insecticides have been developed and placed on the market in forms of insecticidal formulations containing as the active ingredient the compound of this invention either alone or in combined with other known insecticidal materials. However, since there has been confronted of the acquirement of resistance by the insects to some of these insecticides or the extremely high toxicities thereof in mammals, development of new insecticides having high activities but low animal toxicities and phytotoxicities is still desired. The aforementioned 1,9,10,11,12,12-hexachlorotricyclo [7.2.1.0$^{2.8}$] dodeca-3,6,10-triene of this invention is a compound which may meet the above-described requirement, that is, such high insecticidal activities and low animal toxicities and phytotoxicities as described below in details and it is useful as pesticide for public health, veterinary and agriculture.

It is an object of this invention to provide novel and useful, 1,9,10,11,12,12-hexachlorotricyclo [7,2.1.0$^{2.8}$] dodeca-3,6,10-triene and a process for preparing said compound. Another object is to provide insecticidal composition containing 1,9,10,11,12,12 - hexachlorotricyclo [7.2.1.0$^{2.8}$] dodeca-3,6,10-triene as the active ingredient.

According to this invention, the aforementioned 1,9,10, 11,12,12 - hexachlorotricyclo [7.2.1.0$^{2.8}$] dodeca-3,6,10-triene is obtained by reacting hexachlorocyclopentadiene with cycloheptatriene and isolating the resulting reaction product which is the desired product from the reaction mixture. In carrying out the process of this invention hexachlorocyclopentadiene is dissolved in an suitable organic solvent, cycloheptatriene is added to the resulting solution and the resulting mixture is heated at a given temperature for a given period of time. The molar ratio of the starting materials used in the process of this invention is most preferably 2 moles of cycloheptatriene per one mole of hexachlorocyclopentadiene, thereby obtaining the desired product in the maximum yield. The reaction may proceed smoothly with the reactants in molar ratios other than mentioned above. The reaction temperature may be in the range between about 100° C. and about 150° C. and the temperature approximately 125° C. is preferable. The reaction time is in the range between about 8 hours and about 10 hours and the time approximately 8 hours is preferable. The solvents which may be used in the process of this invention include all the organic solvents usually used in the ordinary Diels-Alder reactions and the preferred ones are organic solvents boiling points of which are in the range of such temperatures as defined above such as, for example, xylene or toluene.

Efforts have been made to elucidate the compositions of reaction product obtained by the above-described reaction with the finding that it is consisted of four constituents indicated in the following table.

| Constituent | Appearance | M.P. or B.P. | Elementary analysis | IR and NMR spectra | Structural formula | Insecticidal activity |
|---|---|---|---|---|---|---|
| (1) | Plate | M.P., 93° C | Calc'd. for C$_{12}$H$_8$Cl$_6$: C, 39.48; H, 2.21; Cl, 59.28. Found: C, 39.46; H, 2.12; Cl, 59.28. | IR as shown in Fig. 1. NMR as shown Fig. 2. | [structure] | + |
| (2) | Red oil | B.P., 132° C./0.015 mm. Hg | Calc'd. for C$_{12}$H$_{10}$Cl$_6$: C, 39.27; H, 2.75; Cl, 57.98. Found: C, 40.70; H, 2.92; Cl, 56.24. | | | + |
| (3) | Resinous substance. | | | | | − |
| (4) | Needles | Begins to sublime at 222° C | | | | − |

The aforementioned four constituents (1)–(4) may be isolated by conventional method such as chromatographic procedure or fractional crystallization.

For example, the reaction product after completion of the reaction is subjected to distillation, the residue is dissolved in benzene or petroleum ether and the resulting solution is chromatographed on alumina. Constituent (1) is eluted by the use of petroleum ether, n-hexane, ligroin or isooctane as the eluting agent, thereafter constituent being isolated by removing the solvent from the eluate. Next, use of benzene as the eluting agent results in elution of constituents (2) and (4), which are separated by treating the residue from removal of the solvent from the eluate with methanol. Constituent (2) is soluble, whereas (4) is insoluble in methanol. Constituent (3) is finally eluted by using methanol or ethanol as the eluting agent. Alternatively, constituents (1)–(4) may be isolated by the following procedures instead of one as described above. After completion of the reaction, the reaction mixture is distilled and the residue is treated with methanol to give methanol-insoluble and methanol-soluble fractions separately. From the methanol soluble fraction are separately obtained crystalline and oily substances, the former being recrystallized from n-hexane to give constituent (1) as plates. Distillation in vacuum of the oily substance yielded constituent (2) as red oil. From the methanol-insoluble fraction are yielded constituent (3) which is a resinous substance and constituent (4) which has a high melting point, though in minimum quantities.

The results of tests on the insecticidal activities of the composition according to this invention are shown below.

(1) Insecticidal activity against Musca domestica L.

150 mg. of 1,9,10,11,12,12 - hexachlorotricyclo [$7.2.1.0^{2.8}$] dodeca-3,6,10-triene are dissolved in 5 ml. of acetone to prepare a solution containing 30γ of the agent per 0.001 ml. The original solution is diluted to test solutions containing the agent in concentrations given in the below table per 0.001 ml. respectively. Control solutions are prepared of chlordane in such a way that the same amount of the agent is dissolved in the same amount of acetone followed by dilution to given concentrations. The insects used in the experiments are 4-day-old female adults after emergence weighing 20–21 mg. 25 insects are used in one experiment and two experiments are conducted at each concentration. 0.001 ml. of the test solution is applied to the thorax of the insect by means of a microsyringe. The treated insects are placed in a cardboard case in which cotton balls immersed in 10% milk solution are hung. The case is incubated at 26° C. for 24 hours followed by comparative examinations of dead insects with the case with chlordane.

The results are listed in the table below.

*Insecticidal activities against Musca domestica L.*

| Concentration of the agent (γ/insect) | Ratio of dead insects (percent) (26° C.) | |
|---|---|---|
| | 1,9,10,11,12,12-Hexachlorotricyclo [$7.2.1.0^{2.8}$] dodeca-3,6,10-triene | Chlordane |
| 30 | 100 | 100 |
| 1.5 | 100 | 100 |
| 0.75 | 100 | 100 |
| 0.3 | 70 | 70 |

(2) Insecticidal activity against Blattella germanica L.

1 g. of 1,9,10,11,12,12-hexachlorotricyclo [$7.2.1.0^{2.8}$] dodeca-3,6,10-tirene is dissolved in 10 ml. of acetone to prepare a solution containing 100γ of the agent per 0.001 ml. The original solution is diluted to test solutions containing the agent in concentrations given in the below per 0.001 ml. respectively. Control solutions are prepared of chlordane in such a way that the same amount of the agent is dissolved in the same amount of acetone followed by dilution to given concentrations. The insects used in the experiments are female adult Blattella germanica L. and 25 insects are used in one experiment and two experiments are conducted at each concentration. 0.001 ml. of the test solution is applied to the thorax of the insect by means of a microsyringe. The treated insects are placed in a cardboard case in which the innects are fed on solid diet. The case is incubated at 26° C. for 24 hours followed by examination of dead insects in comparison with the case with chlordane. The results are listed in the following table.

*Insecticidal activities against Blattella germanica L.*

| Concentration of the agent (γ/insect) | Ratio of dead insects (percent) (26° C.) | |
|---|---|---|
| | 1,9,10,11,12,12-Hexachlorotricyclo [$7.2.1.0^{2.8}$] dodeca-3,6,10-triene | Chlordane |
| 100 | 100 | 100 |
| 25 | 90 | 100 |
| 6.25 | 45 | 75 |
| 1.56 | 10 | 0 |

(3) Toxicities in mammals

Emulsions of 1,9,10,11,12,12-hexachlorotricyclo ($7.2.1.0^{2.8}$) dodeca-3,6,10-triene in 0.5% tragacanth are prepared at concentrations from 10 to 20%. Groups of five hybrid male mice weighing 10–20 g. are intraperitoneally administered 0.1–0.4 ml. of the emulsion per 10 g. bodyweight and observations are thereafter made for 7 days. $LD_{50}$ is calculated according to Litchfield-Wilcoxon's method from the data shown in the table below.

| Dosage (g./kg.) | Number of dead animals | Number of survival animals |
|---|---|---|
| 5 | 0 | 5 |
| 6 | 1 | 4 |
| 7 | 3 | 2 |
| 8 | 5 | 0 |

$LD_{50}$ calculated from the data above is 6.81 g./kg. bodyweight ($P_{0.05}$=6.01–7.7 g.).

$LD_{50}$ by oral administration is determined as follows. 5–4% emulsion of the agent is prepared in a mixture of water and tragacanth and orally given groups of five hybrid mole mice weighing 15–20 g. by means of a stomach sonde at doses from 0.05 to 0.3 ml. per 10 g. bodyweight.

| Dosage (g./kg.) | Number of dead animals | Number of survival animals |
|---|---|---|
| 6 | 0 | 5 |
| 8 | 2 | 3 |
| 10 | 1 | 4 |
| 12 | 1 | 4 |

As indicated in the above table, $LD_{50}$ cannot be determined at a large dose of 12 g./kg. bodyweight and no larger doses may be made experimentally.

A female adult dog weighing 6.3 kg. is fed on a diet containing 1 g. of the pulverized agent per kg. bodyweight. Slight clonic and reflexive spasms are observed in the animal 2 to 3 hours after the administration, which completely disappear 22 hours after the administration.

The results of toxicological tests described above evidently indicate that 1,9,10,11,12,12-hexachlorotricyclo ($7.2.1.0^{2.8}$) dodeca-3,6,10-triene produces almost no toxicities in mammals.

In preparing insecticidal compositions containing the compound of this invention, 1,9,10,11,12,12-hexachlorotricyclo ($7.2.1.0^{2.8}$) dodeca-3,6,10-triene, as the active ingredient, dusts, wettable powders, emulsions, solutions and aerosols may be adaptable according to the usual methods of preparation and formulations as in other insecticidal compositions. In dust formulations clay, kaoline, talc, diatomaceous earth and the like may be employed as the solid carrier, to which the aforementioned compound is added with mixing in such a ratio that the dust contains 2–5% active ingredient. For wettable powders is added a surface active agent, such as for example, higher aliphatic acid sulfonates, polyoxyethylene alkyl aryl ethers, polyoxyethylene diaryl phenol ethers and polyoxyethylene alkyl ethers to the above-cited solid carrier, to the resulting mixture is added the aforementioned compound at such concentrations as 30–10% and the final mixture is then pulverized. Liquid compositions are prepared by adding the aforementioned compound to a liquid carrier, such as for example, benzene, toluene, xylene, solvent naphtha, dimethylformamide and kerosin in such a way that the liquid composition contains 1–10% active ingredient. Emulsions are prepared by adding the aforementioned compound to a mixture of the above-cited liquid carrier and the above-cited surface active agent in such a way that the emulsion contains 20–45% active ingredient. Aerosols are prepared by adding a gas carrier, such as for example, air, nitrogen, carbon dioxide (Dry Ice), methylene chloride and fleon to a 1–10% solution of the aforementioned compound in the above-cited liquid carrier and placing the resulting mixture in a closed vessel.

In order that the invention may be better understood, the following examples are given, and it should be understood that these are given for illustration but not for limitation of the scope of the invention.

EXAMPLE 1

(a) A solution of 45 g. (0.5 mol.) of cycloheptatriene in 100 ml. of xylene is heated at 135–137° C. in a 500-ml. four-necked round-bottomed flask equipped with a separatory funnel, stirrer, thermometer and condenser. To the heated mass are added dropwise from the separatory funnel 68 g. (0.25 mol.) of hexachlorocyclopentadiene over a period of 1 hour. Stirring is continued at the same temperature for additional about 8 hours. After completion of the reaction, the reaction mixture is subjected to distillation in vacuum (70 mm. Hg) to remove the solvent and the cycloheptatriene unreacted. Subsequent vacuum distillation (0.3 mm. Hg) gives the hexachlorocyclopentadiene unreacted. The residue is allowed to stand at room temperature for 10 hours to yield about 85.1 g. of crude crystals.

(b) A solution of 20 g. of the crude crystals obtained as above in 10 ml. of benzene is chromatographed on alumina in a column 3 cm. x 35 cm. in size. The absorption column is treated with ligroin and the eluate is concentrated. To the concentrate thus produced is added 100 ml. of 90% ethanol and the insoluable matter is removed by filtration at 45° C. The filtrate is concentrated to 50 ml. followed by cooling with ice to give 16.52 g. of 1,9,10,11,12,12-hexachlorotricyclo [7.2.1.0$^{2.8}$] dodeca-3,6,10-triene as flat plates; M.P. 93.5–94 °C; I.R. $\nu$ c=c ($^{NaCl}_{Nujol}$) 1610 cm.$^{-1}$ (s) and 1640 cm.$^{-1}$ (W)

*Analysis.*—Calc'd. for $C_{12}H_8Cl_6$: C, 39.48; H, 2.21; Cl, 59.28. Found: C, 39.42; H. 2.22; Cl, 59.29.

EXAMPLE 2

Substantially the same procedures as in Example 1(a) are repeated except that reaction temperature of about 122° C. is applied in place of the reaction temperature from 135 to 137° C. in said example to give 84.8 g. of crude crystals. 20 g. of the crude crystals are treated in substantially the same way as in Example 1(b) to yield 16.9 g. of 1,9,10,11,12,12-hexachlorotricyclo [7.2.1.0$^{2.8}$] dodeca-3,6,10-triene melting at 93.5–94° C.

EXAMPLE 3

Substantially the same procedures as in Example 1(a) are repeated except that toluene and reaction temperature of 100–102° C. are employed in place of the xylene and the reaction temperature of 135–137° C. in said example respectively to give 36 g. of crude crystals. 20 g. of the crude crystals are treated in substantially the same way as in Example 1(b) to yield 14.47 g. of 1,9,10,11,12,12-hexachlorotricyclo [7.2.1.0$^{2.8}$] dodeca-3,6,10-triene melting at 93.5–94° C.

EXAMPLE 4

Substantially the same procedures as in Example 1(a) are repeated except that benzene is used in place of the xylene in said example to give 15.7 g. of crude crystals. 10 g. of the crude crystals are treated in substantially the same way as in Example 1(b) except that an alumina column 1.5 cm. x 20 cm. in size is used to yield 8.36 g. of 1,9,10,11,12,12-hexachlorotricyclo [7.2.1.0$^{2.8}$] dodeca-3,6,10-triene melting at 93.5–94° C.

EXAMPLE 5

(a) 136 g. (about 1.5 mol.) of cycloheptatriene is heated to a temperature of 110° C. in a 300 ml. four-necked round-bottomed flask equipped with a stirrer, thermometer, condenser and separatory funnel. To the heated mass are added dropwise from the separtory funnel 68 g. (0.25 mol.) of hexachlorocyclopentadiene over a period of 3 hours followed by stirring at the same temperature for additional about 5 hours. After completion of the reaction, the reaction mixture is subjected to distillation in vacuum (70 mm. Hg) to remove the cycloheptatriene unreacted followed by further vacuum distillation (0.3 mm. Hg) to remove hexachlorocyclopentadiene unreacted. The residue is allowed to stand at room temperature for 10 hours to give about 85.2 g. of crude crystals.

(b) 20 g. of the crude crystals thus obtained is dissolved in 10 ml. of benzene and the solution is chromatographed on alumina in a column 3 cm. x 35 cm. in size. The obsorption column is treated with ligroin and the eluate is concentrated. To the concentrate thus produced is added 100 ml. of 90% ethanol and the insoluble matter is removed by filtration at 45° C. The filtrate is concentrated to 50 ml. followed by cooling with ice to yield 17.12 g. of 1,9,10,11,12,12-hexachloro [7.2.1.0$^{2.8}$] dodeca-3,6,10-triene as flat plates; M.P. 93.5–94° C. The I.R. spectrum and analytical data are the same as those of the product obtained in Example 1.

*Analysis.*—Calc'd for $C_{12}H_8Cl_6$: C, 39.48; H, 2.21; Cl, 59.28. Found: C, 39.47; H, 2.21; Cl, 59.26.

EXAMPLE 6

Substantially the same procedures as in Example 5(a) are repeated except reaction temperature of about 100° C. is applied in place of 110° C. in Example 5(a) to give 61.7 g. of crude crystals. 20 g. of the crude crystals are treated in substantially the same way as in Example 5(b) to yield 17.18 g. of 1,9,10,11,12,12-hexachlorotricyclo [7.2.1.0$^{2.8}$] dodeca-3,6,10-triene melting at 93.5–94° C.

EXAMPLE 7

Substantially the same procedures as in Example 5(a) are repeated except that reaction temperature of about 120° C. is applied in place of 110° C. in said example to give 87.1 g. of crude crystals. 20 g. of the crude crystals are treated in substantially the same way as in Example 5(b) to yield 17.22 g. of 1,9,10,11,12,12-hexachlorotricyclo [7.2.1.0$^{2.8}$] dodeca-3,6,10-triene melting at 93.5–94° C.

EXAMPLE 8

Substantially the same procedures as in Example 5(a) are repeated except that reaction temperature of about 130° C. are applied in place of 110° C. in said example to give 87.2 g. of crude crystals. 20 g. of the crude crystals are treated in substantially the same way as in Example 5(b) to yield 16.42 g. of 1,9,10,11,12,12-hexachlorotricyclo [7.2.1.0$^{2.8}$] dodeca-3,6,10-triene melting at 93.5–94° C.

EXAMPLE 9

Substantially the same procedures as in Example 5(a) are repeated except that reaction temperature of about 140° C. is applied in place of 110° C. in said example to give 84.1 g. of crude crystals. 20 g. of the crude crystals are treated in substantially the same procedures as in Example 5(b) to yield 15.06 g. of 1,9,10,11,12,12-hexachlorotricyclo [7.2.1.0$^{2.8}$] dodeca-3,6,10-triene melting at 93.5–94° C.

EXAMPLE 10

Substantially the same procedures as in Example 5(a) are repeated except that reaction temperature of about 155° C. is applied in place of 110° C. in said example to give 89.2 g. of crude crystals. 20 g. of the crude crystals are treated in substantially the same way as in Example 5(b) to yield 13.3 g. of 1,9,10,11,12,12-hexachlorotricyclo [7.2.1.0$^{2.8}$] dodeca-3,6,10-triene melting at 93.5–94° C.

The following Examples 11–14 illustrate typical insecticidal compositions of this invention.

EXAMPLE 11

*Dust composition*

|  | G. |
|---|---|
| 1,9,10,11,12,12-hexachlorotricyclo [7.2.1.0$^{2.8}$] dodeca-3,6,10-triene | 2 |
| Clay | 50 |
| Talc | 48 |

The above composition is mixed to a dust.

EXAMPLE 12

*Emulsion*

|  | G. |
|---|---|
| 1,9,10,11,12,12-hexachlorotricyclo [7.2.1.0$^{2.8}$] dodeca-3,6,10-triene | 20 |
| Solvent naphtha | 60 |
| Polyoxyethylene nonylphenyl ether | 20 |

The above composition is mixed to an emulsion, which is diluted with water to a suitable concentration for use.

EXAMPLE 13

*Wettable powder*

|  | G. |
|---|---|
| 1,9,10,11,12,12-hexachlorotricyclo [7.2.1.0$^{2.8}$] dodeca-3,6,10-triene | 30 |
| Talc | 65 |
| Sodium dodecyl benzene sulfonate | 3 |
| Polyvinyl alcohol | 2 |

The above composition is mixed and pulverized to a wettable powder, which, on use, is diluted with water to a suitable concentration.

EXAMPLE 14

*Liquid composition*

|  | G. |
|---|---|
| 1,9,10,11,12,12-hexachlorotricyclo [7.2.1.0$^{2.8}$] dodeca-3,6,10-triene | 5 |
| Toluene | 95 |

The above composition is mixed to a liquid composition.

We claim:

1. 1,9,10,11,12,12-hexachlorotricyclo [7.2.1.0$^{2.8}$] dodeca-3,6,10-triene.

2. A process for preparing 1,9,10,11,12,12-hexachlorotricyclo [7.2.1.0$^{2.8}$] dodeca-3,6,10-triene which comprises reacting hexachlorocyclopentadiene with cycloheptatriene at a temperature of about between 100–150° C. for a period of about between 8 to 10 hours and isolating the 1,9,10,11,12,12-hexachlorotricyclo [7.2.1.0$^{2.8}$] dedeca-3,6,10-triene thus formed.

3. An insecticidal composition comprising about 2–5% of 1,9,10,11,12,12-hexachlorotricyclo [7.2.1.0$^{2.8}$] dodeca-3,6,10-triene as the active ingredient with the remainder being a solid carrier in dust form.

4. An insecticidal composition comprising about 10–30% of 1,9,10,11,12,12-hexachlorotricyclo [7.2.1.0$^{2.8}$] dedeca-3,6,10-triene as the active ingredient with the remainder being a solid carrier in the form of a wettable powder.

5. An insecticidal composition comprising about 1–10% of 1,9,10,11,12,12-hexachlorotricyclo [7.2.1.0$^{2.8}$] dodeca-3,6,10-triene as the active ingredient with the remainder being a liquid carrier.

6. An insecticidal composition in the form of an emulsion comprising about 20–45% of 1,9,10,11,12,12-hexachlorotricyclo [7.2.1.0$^{2.8}$] dodeca-3,6,10-triene, the remainder being a liquid carrier and a surface active agent.

7. An insecticidal composition comprising about 1–10% of 1,9,10,11,12,12-hexachlorotricyclo [7.2.1.0$^{2.8}$] dodeca-3,6,10-triene, the remainder being a pressurized gas.

References Cited by the Examiner

UNITED STATES PATENTS 2,952,710   9/1960   Fields _____ 260—648

JULIAN S. LEVITT, *Primary Examiner.*

LEON ZITVER, *Examiner.*